May 14, 1935.  F. J. BOEHLER  2,001,451

TRAILER HITCH

Filed Dec. 9, 1933

Inventor
Fritz J. Boehler

By Hardway Rathey
Attorneys

Patented May 14, 1935

2,001,451

UNITED STATES PATENT OFFICE 2,001,451

TRAILER HITCH

Fritz J. Boehler, Houston, Tex.

Application December 9, 1933, Serial No. 701,652

3 Claims. (Cl. 280—33.15)

This invention relates to a trailer hitch.

An object of the invention is to provide a device of the character described specially designed for coupling vehicles together and more particularly for hitching a trailer to a tractor in front.

Another object of the invention is to provide a coupling device adapted to be hitched to the rear end of a tractor and to which the draw bar of the trailer may be readily connected so that it may be quickly and easily released.

With the above and other objects in view, the invention has particular relation to certain novel features of construction, operation and arrangement of parts, an example of which is given in this specification and illustrated in the accompanying drawing, wherein Figure 1 shows a side view of the coupling device shown connected to the rear end of a tractor with the trailer draw bar connected thereto.

Figure 1:
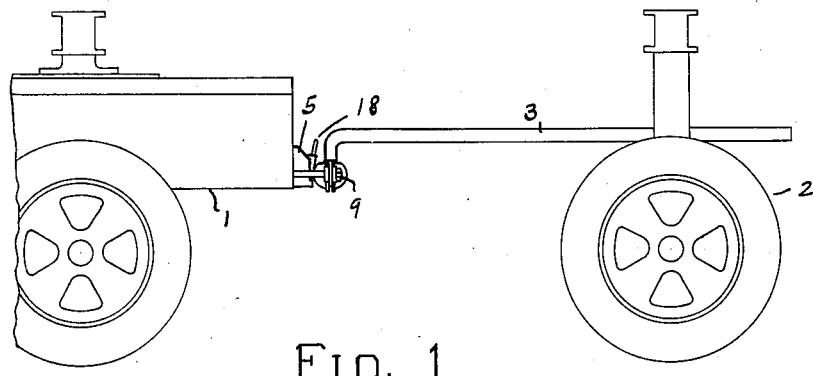
Figure 2:
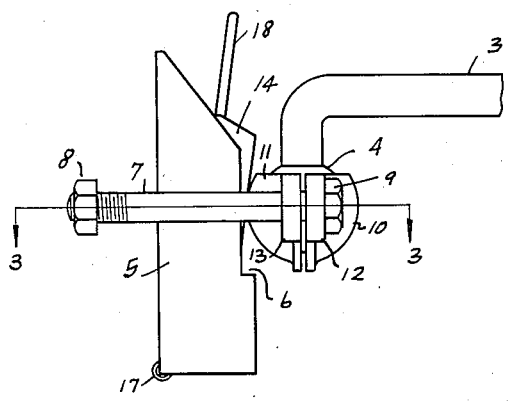
Figure 2 shows an enlarged side elevation of the hitch.
Figure 4:
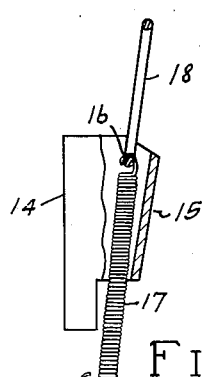
Figure 4 shows a fragmentary side view partly in section of the wedge member employed.
Figure 3:
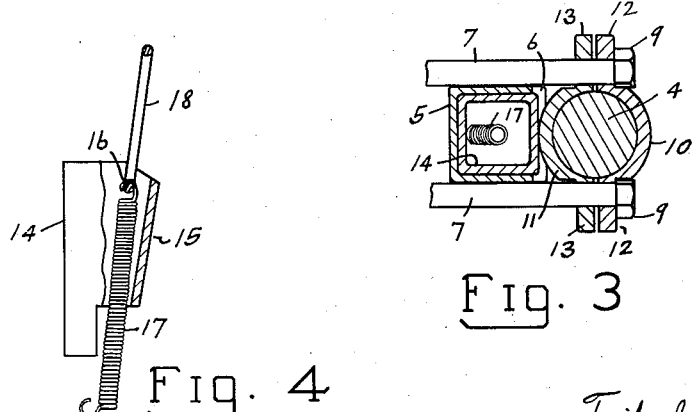
Figure 3 shows a horizontal cross sectional view taken on the line 3—3 of Figure 2.

In the drawing the numeral 1 designates a tractor and the numeral 2 designates a trailer to be coupled to the rear end of the tractor and having the draw bar 3 whose forward end is downwardly curved and formed with the ball joint member 4.

Secured to the rear end of the tractor there is the vertically arranged guide member 5 which is preferably rectangular in horizontal cross section although it may be made of any selected shape. This guide member is of tubular formation and the upper portion of its rear wall is cut away providing the opening 6.

Secured in any suitable manner, to opposite sides of the guide member 5 are the bolts 7 whose forward ends are threaded to receive the nuts 8 and whose rear ends have the heads 9 thereon. These bolts form means for attaching the guide member to the rear end of the tractor.

Slidably mounted on the rear ends of the bolts 7 are the sections 10, 11, of the socket bearing which receives the ball joint member 4. The sections 10, 11 have the outwardly turned lugs 12, 12 and 13, 13 having bearings to receive the rear ends of the bolts 7 and the lugs 12 abut and, if desired, may be welded to the heads 9.

There is a wedge member 14 preferably formed hollow and which is shaped to fit within the guide 5. The forward side or face 15 of the wedge member tapers downwardly so as to wedge against the facing side of the section 11 so as to hold said section in place and to prevent the displacement of the ball joint member 4 from the socket bearing.

The wedge member 14 has a cross rod 16 secured therein and a spring 17 has its upper end secured to said cross rod and its lower end attached to the lower end of the guide 5 whereby the wedge member is anchored against displacement. A handle, or grip member 18 is attached to and upstands from the wedge member 14.

When it is desired to detach the trailer from the tractor the handle 18 may be grasped and the wedge member 14 pulled upwardly out of the guide 5, the spring 17 yielding to permit this, and the section 11 may then be moved forwardly and the ball joint member 4 lifted out of the socket bearing and when the handle 18 is released, the spring 17 will return the wedge member into the guide. In a similar manner when it is desired to hitch the trailer to the tractor the wedge member 14 may be elevated as before, and the section 11 moved rearwardly to permit the ball joint member 4 to be inserted into the bearing and when the wedge member 14 is replaced in the guide it will force the section 11 rearwardly and into a close fit around the joint member 4.

It is to be noted that the lugs 12, 13 are spaced a distance apart so that the wear between the parts may be constantly taken up.

The drawing and description disclose what is now considered to be a preferred form of the invention by way of illustration only, while the broad principle of the invention will be defined by the appended claims.

What I claim is:

1. A trailer hitch comprising a guide, a pair of rods between which the guide is secured, said rods forming means for attaching the guide to a draft vehicle, a socket joint member on said rods formed of complemental sections one of which is movable relative to the other and a wedge member in the guide normally wedging against said movable section.

2. A trailer hitch comprising a guide, a pair of rods between which the guide is secured, said rods forming means for attaching the guide to a draft vehicle, a socket joint member on said rods formed of complemental sections one of which is movable relative to the other, a ball joint member in the socket, means for connecting said ball joint member to a drawn vehicle and a wedge member in the guide normally wedging against said movable section to maintain said sections assembled about said joint member.

3. A trailer hitch comprising a guide, a pair of attaching members between which the guide is secured, said attaching members forming means for attaching the guide to a draft vehicle, a socket-joint member on said attaching members formed of complemental sections spaced apart and one of which is movable relative to the other, a ball-joint member in the socket, means for connecting said ball-joint member to a draft vehicle and a wedge member in the guide normally wedging against said movable section to maintain said sections assembled about said ball joint member.

FRITZ J. BOEHLER.